(12) United States Patent
Ahonen et al.

(10) Patent No.: US 9,552,627 B2
(45) Date of Patent: Jan. 24, 2017

(54) ELECTRONIC DEVICE AND METHOD IN AN ELECTRONIC DEVICE FOR PROCESSING IMAGE DATA

(71) Applicant: Nokia Technologies Oy, Espoo (FI)

(72) Inventors: Petri Ahonen, Jyvaskyla (FI); Simo Rossi, Palokka (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/563,241

(22) Filed: Dec. 8, 2014

(65) Prior Publication Data

US 2015/0146043 A1 May 28, 2015

Related U.S. Application Data

(63) Continuation of application No. 11/792,120, filed as application No. PCT/FI2005/050474 on Dec. 22, 2005, now Pat. No. 8,908,080.

(30) Foreign Application Priority Data

Dec. 29, 2004 (FI) ..................................... 20045511

(51) Int. Cl.
*H04N 5/225* (2006.01)
*G02B 13/16* (2006.01)
(Continued)

(52) U.S. Cl.
CPC ................ *G06T 5/002* (2013.01); *G06T 5/20* (2013.01); *H04N 5/23212* (2013.01);
(Continued)

(58) Field of Classification Search
CPC .. G06T 5/002; G06T 5/20; G06T 2207/10004; G06T 2207/20024; H04N 5/23212; H04N 5/262
(Continued)

(56) References Cited

U.S. PATENT DOCUMENTS

| 4,998,126 A | 3/1991 | Kazami ......................... 354/400 |
| 6,556,784 B2 | 4/2003 | Onuki ............................. 396/52 |

(Continued)

FOREIGN PATENT DOCUMENTS

| EP | 1391842 A2 | 2/2004 |
| JP | 05-328192 | 12/1993 |

(Continued)

OTHER PUBLICATIONS

James Owens, "Method for depth of field (DOF) adjustment using combination of object segmentation and pixel binning", Feb. 1, 2004, 1 page.

*Primary Examiner* — Yogesh Aggarwal
(74) *Attorney, Agent, or Firm* — Harrington & Smith

(57) ABSTRACT

The invention relates to an electronic device for performing imaging, including a camera for creating image data (ID) from an imaging target (IT), the imaging target (IT) including at least one primary image object (I1) and at least one secondary image object (I2), an image-processing chain arranged in connection with the camera, for processing the image data created from the imaging target, and a focussing unit for focussing the camera on at least the primary image object. In addition, a blurring unit is arranged in the image-processing chain, to blur at least some of the said secondary image objects in the image data, and arranged to use the information produced by the focussing unit.

19 Claims, 4 Drawing Sheets

(51) Int. Cl.
  *G06T 5/00* (2006.01)
  *H04N 5/262* (2006.01)
  *G06T 5/20* (2006.01)
  *H04N 5/232* (2006.01)

(52) U.S. Cl.
  CPC ......... *H04N 5/23229* (2013.01); *H04N 5/262* (2013.01); *H04N 5/2621* (2013.01); *G06T 2207/10004* (2013.01); *G06T 2207/20024* (2013.01)

(58) Field of Classification Search
  USPC ............... 348/335, 340, 345, 348, 350, 352
  See application file for complete search history.

(56) References Cited

U.S. PATENT DOCUMENTS

| | | | |
|---|---|---|---|
| 7,106,376 B1* | 9/2006 | Anderson | G03B 13/36 348/208.12 |
| 2001/0013895 A1 | 8/2001 | Aizawa et al. | |
| 2001/0038748 A1 | 11/2001 | Onuki | 396/52 |
| 2002/0060739 A1 | 5/2002 | Kitamura et al. | 348/222 |
| 2002/0080261 A1* | 6/2002 | Kitamura | H04N 5/232 348/349 |
| 2002/0140823 A1* | 10/2002 | Sakurai | H04N 5/232 348/207.99 |
| 2002/0191100 A1 | 12/2002 | Matsunaga et al. | 348/345 |
| 2003/0052988 A1* | 3/2003 | Kurosawa | H04N 5/262 348/360 |
| 2003/0071905 A1 | 4/2003 | Yamasaki | 348/239 |
| 2003/0117511 A1 | 6/2003 | Belz et al. | 348/333.11 |
| 2003/0231243 A1* | 12/2003 | Shibutani | G03B 17/02 348/207.99 |

FOREIGN PATENT DOCUMENTS

| | | |
|---|---|---|
| JP | 10020392 A | 1/1998 |
| JP | 11136568 | 5/1999 |
| JP | 11252427 A | 9/1999 |
| JP | 2002-027425 | 1/2002 |
| JP | 2003-101858 | 4/2003 |
| JP | 11-266388 | 9/2009 |

* cited by examiner

ELECTRONIC DEVICE AND METHOD IN AN ELECTRONIC DEVICE FOR PROCESSING IMAGE DATA

CROSS REFERENCE TO RELATED APPLICATION

This is a continuation patent application of U.S. patent application Ser. No. 11/792,120 filed May 31, 2007, which is a national stage application of PCT Application No. PCT/FI2005/050474 filed Dec. 22, 2005, which are hereby incorporated by reference in their entireties.

TECHNICAL FIELD

The present invention relates to an electronic device for performing imaging, including
- camera means for forming image data from an imaging target, the imaging target including at least one primary image object and at least one secondary image object,
- an image-processing chain arranged in connection with the camera means, for processing the image data formed from the imaging target, and
- focussing means for focussing the camera means on at least one primary image object.

In addition, the invention also relates to a corresponding method, program product, and focussing module, for implementing the invention.

BACKGROUND

In small digital cameras, the depth of field is relatively wide, due to, among other factors, their short focal length. One example of this group of cameras is mobile stations equipped with a digital imaging capability. The great depth of field makes it difficult to create a blurred background in the image. One example of such an imaging application is portraits. In them, it is only the primary image object that is desired to be shown sharply, the background, i.e. the secondary image objects, being desired to be blurred.

Solutions are known from the prior art, in which a shallow depth of field is implemented by using a large aperture (small F-number) and a long focal length. This arrangement is known, for example, from SLR (Single Lens Reflex) cameras. Another possibility is blurring implemented by post-editing. This is a common functionality, for example, in still-image editors. US patent publication US-2002/0191100 A1 (Casio Computer Co. Ltd.) discloses one background-blurring method performed in a camera device in connection with imaging. It is based on capturing two images at the moment of imaging. The first image is focussed on the primary image object and before the second image is captured the focussing is altered to either the close or distant setting. After taking the shots, the first and second images are synthesized with each ether. As a result of the synthesizing, a final image is obtained, in which the object is imaged sharply while the background is blurred.

Some other prior arts applying two or several images describe US 2002/0140823 A1, US 2002/0060739 A1, US 2003/0071905 A1 and US 2002/0191100 A1.

SUMMARY

The present invention is intended to create a way of blurring non-desired imaging objects in digital imaging. The characteristic features of the electronic device according to an embodiment of the invention include the following. For example, an electronic device for performing imaging, includes a camera means for forming image data from an imaging target, the imaging target including at least one primary image object and at least one secondary image object. The electronic device also includes an image-processing chain arranged in connection with the camera means for processing the image data formed from the imaging target, and a focussing means for focussing the camera means on at least one primary image object. Blurring means are arranged in the image-processing chain, to blur at least some of the said secondary image objects in the image data, which blurring means are arranged to use the information produced by the focussing means.

According to another embodiment of the invention, disclosed is a method in digital imaging for processing image data, in which method camera means are used to form image data from an imaging target, the imaging target including at least one primary image object and at least one secondary image object. The camera means are focussed on at least one primary image object, and the camera means are used to form focussed image data, which image data is processed in the device, in order to achieve the desired changes in the image data. In the processing, at least some of the said secondary image objects in the image data are blurred using the information produced in the focussing.

In addition, the invention also relates to a corresponding program product and a focussing module to be fitted for use in the device. Thus, according to an embodiment of the invention, disclosed is a program product for processing image data in an electronic device, which program product forms of a storage medium and program code written on the storage medium to be executed using a processor means. The electronic device includes camera means for forming image data from an imaging target, the imaging target including at least one primary image object and at least one secondary image object, an image-processing chain arranged in connection with the camera means, for processing the image data formed from the imaging target, and focussing means for focussing the camera means on at least one primary image object. The program code includes first code means configured to blur at least some of the said secondary image objects in the image data, using the information produced by the focussing means.

According to another embodiment of the invention, disclosed is a focussing module, which can be arranged in an electronic device for performing imaging. The device includes camera means for forming image data from an imaging target, the imaging target including at least one primary image object and at least one secondary image object, an image-processing chain arranged in connection with the camera means, for processing, in the device, the image data formed from the imaging target, and in which the focussing module can be arranged in the device at least for focussing the camera means on at least one primary image object. In addition, blurring means are arranged in the image-processing chain to blur at least some of the secondary image objects in the image data, which blurring means are arranged to use the information produced by the focussing module.

In the invention, blurring is performed using the information produced by focussing.

The invention is particularly suitable for application, for example, in such digital cameras, in which there is wide depth of field. Such cameras are known, for example, from mobile stations. The invention can be applied in bath still and video imaging.

In the invention, the information obtained from focussing of the camera is applied. The one or more image objects in the image in which sharpness is to be retained, and correspondingly the image objects to be blurred, can be decided on the basis of this information. Focussing information is available immediately in the imaging situation, so that its application takes place very smoothly for achieving the purposes of the invention.

The blurring of inessential image objects can be performed, for example, by using filtering. There can even be precalculated filtering coefficients in the device for filtering, from which the most suitable group of coefficients can be selected for use in each situation. On the other hand, the statistics formed for focussing can be used to calculate the filtering coefficients.

In the invention, the end user can create a blurring effect in the image surprisingly already in the imaging stage using the camera. Thus, there is no need at all for a separate post-editing operations that would take place outside the device after the imaging event.

One of the advantages achieved by the invention is that using small cameras, which generally are precisely those with wide depth of field, an such image can be achieved, in which the primary image object is sharp and the background, or the secondary image objects in general, are blurred or otherwise made unclear.

The other characteristic features of the invention will become apparent from the accompanying Claims while additional advantages achieved are itemized in the description portion.

BRIEF DESCRIPTION OF THE DRAWINGS

The invention, which is not restricted to the embodiments described in the following, is examined in greater detail with reference to the accompanying figures, in which.

DETAILED DESCRIPTION

Figure 1:
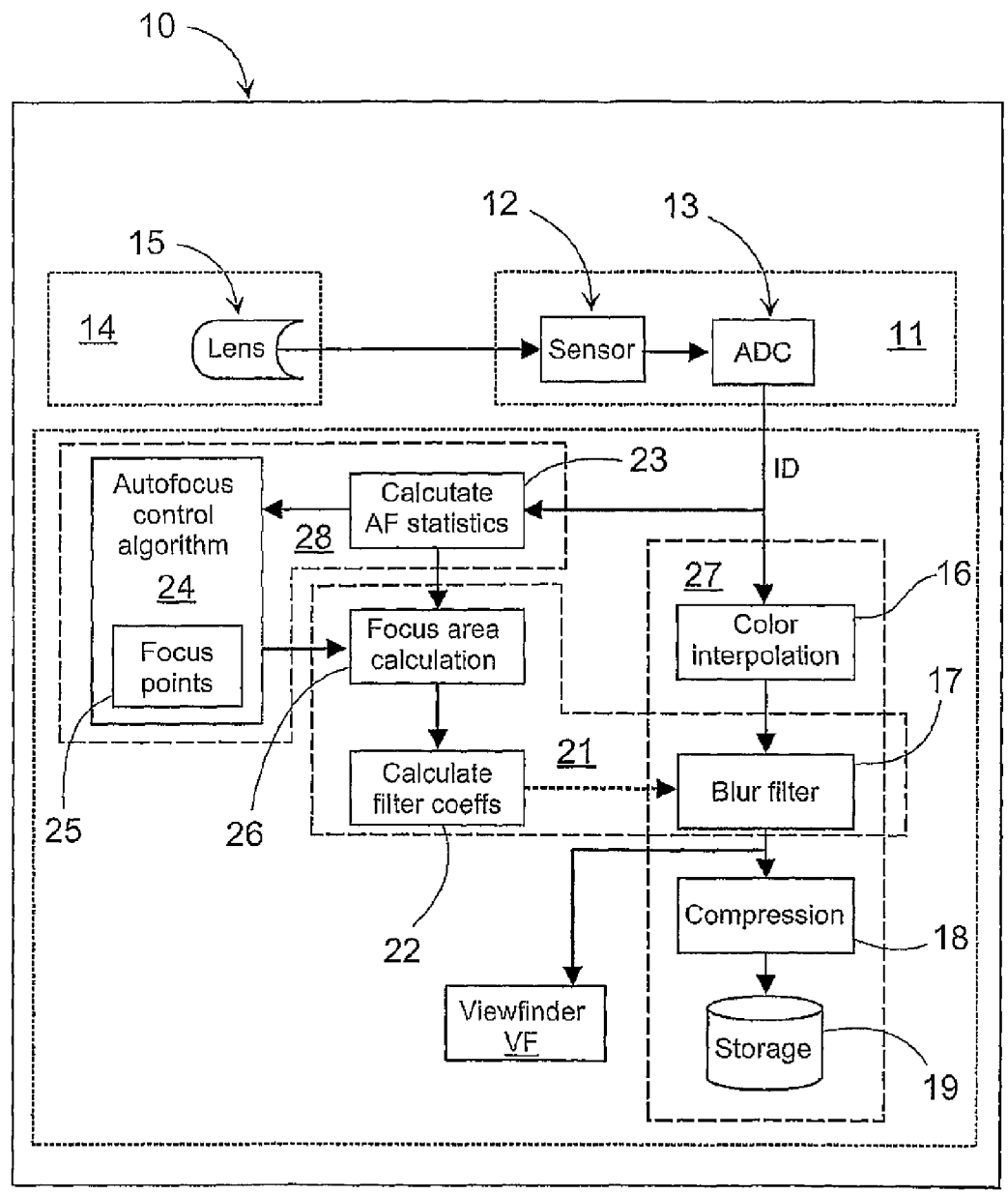
FIG. 1 shows an example in principle of an application of the electronic device according to the invention, as a schematic diagram.
Figure 2:
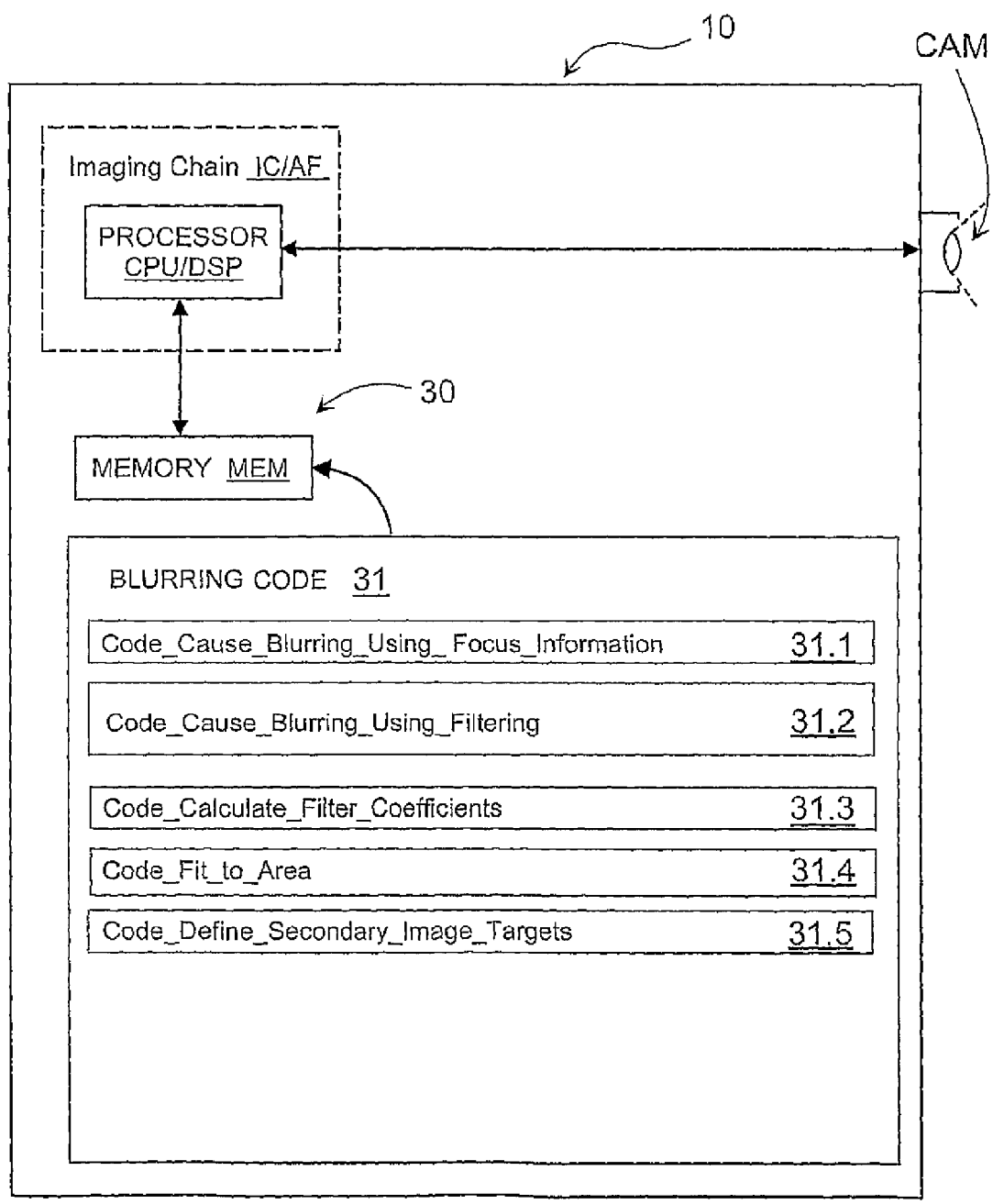
FIG. 2 shows an example of an application of the program product according to the invention, for implementing blurring in an electronic device in the manner according to the invention.

FIG. 1 shows an example in principle of an application of the electronic device 10 according to the invention, as a flow diagram, on the basis of which the invention is described in the following. In addition, FIG. 2 shows an example of the program product 30 according to the invention. The program product 30 forms of a storage medium MEM and program code 31 stored on it, with reference to the code means 31.1-31.5 belonging to which program code 31 being made at suitable points in the following description, to connect them to the method and device 10 according to the invention.

The device 10 can be, for example, a digital camera equipped with a still and/or video imaging capability, a digital video camera, a mobile station equipped with a camera, or some other similar smart communicator (PDA), the components of which that are inessential from the point of view of the invention are not described in greater detail in this connection. The invention relates not only to the device 10, but equally to an imaging-chain system 27 and a focussing module 28, such as may be, for example, in the device 10. One example of such a focussing module 28 is the Ai-AF system developed by Canon.

The device 10 according to the invention, and with it also the imaging system can include, as modular components, camera means 11, 14 and a digital image-processing chain 27 connected to it and a focussing circuit 28.

The camera means 11, 14 can include an image sensor totality 12, 13, which is as such known, together with movable lenses 15, by means of which image data ID of the imaging target IT can be formed. The imaging target IT, which is converted by the camera sensor 12 in a known manner to form electrical signals, is converted into a digital form using an AD converter 13.

The focal length of the camera means 11, 14 may be less than 35 mm declared as a focal length equivalency with 35 mm film. Some examples of the focal lengths of the camera means may be, declared as a focal length equivalency with 35 mm film, for example, 15-20 mm (special wide-angle), 20-28 mm (wide-angle) or 28-35 mm (mild wide-angle). The use of the invention achieves a particular advantage in devices 10 with an extensive depth of field, but the invention can of course also be applied in such devices with a narrow depth of field (for example, teleobjectives).

The focussing means 28 are in the device 10 for focussing the camera means 11, 14. A solution that is, for example, as such, known, or which is still under development, can be applied as a focussing circuit 28. Using the focussing circuit 28, at least one of the image objects I1, I2 in the imaging target IT can be focussed to the camera means 11, 14, more particularly to the sensor 12, prior to the performance of the imaging that it intended to be stored, or even during imaging to be stored, if the question is of, for example, a video imaging application. This is because the imaging target IT can include at least one primary image object I1, relative to which it is wished to focus the camera means 11, 14, and at least one secondary image object I2, which is an image subject that is of less interest from the point of view of the imaging. It can be, for example, the background to the primary image object I1.

In cameras, focussing conventionally involves the collection of statistics from the image data ID. According to one embodiment, the statistics can include, for example, a search for gradients for the detection of the edge of the primary image object I1. The statistics can be formed of, for example, luminance information of the image data ID. The focussing operations also include the movement of the lenses 15, in order to maximize the statistical image sharpness mathematically by comparing statistical information. Focussing can be performed automatically or also by the end user, who can manually adjust the focus, if there is, for example, a manually adjustable focus disc (mechanical focus control) in the camera.

If the focussing is implemented automatically in the device 10, the focussing circuit 28 shown in FIG. 1 can include an as such known autofocus control algorithm 24, in which there can be a focus-point definition portion 24 as a sub-module. As input, the algorithm portion 24 receives AutoFocus AF-data from the calculating module 23 of AF statistics. The statistics module 23 can process the image data ID coming directly from the AD converter 13, in ways that are, as such, known, and form from it, for example, the aforementioned gradient data. On the basis of the data produced by the statistics module 23, the algorithm portion 24 can decide whether it images the selected first image object I1 sharply to the sensor 12 in the set manner. As output, the algorithm portion 24 produces control data that is as such known, for the adjustment mechanism 14 of the set of lenses 15. The control data is used to move the set of lenses 15, in such a way that the one or more image objects I1 defined as primary by the focus-point sub-module 25 is imaged precisely and sharply to the sensor 12.

The image-processing chain 27 connected to the camera means 11, 14 can include various modules in different implementation arrangements, which are used, for example, for processing, in the device 10, the image data ID formed from the imaging target IT. In both cases, whether imaging to be stored is being performed at that moment by the device 10 or not, it is possible to perform so-called viewfinder imaging, for which there can be a dedicated module VF in the device 10. The viewfinder VF can be after colour-interpolation 16, or also after the blurring filter 17 according to the invention, which will be described in greater detail a little later. In that case, the blurred background can, according to the invention, already be seen in the viewfinder image.

The image-processing chain IC can consist of one or more processing circuits/DSPs 16, 18, which are, in terms of the invention, entirely irrelevant components, and no further description of them is necessary in this connection. In this case, the colour-interpolation 16 and image-data ID compression 18 of the image-processing chain 27 are shown. When the image data ID is stored, this can take place to some storage medium 19. The technical implementation of these components, which are irrelevant in terms of the invention, will be obvious to one versed in the art and for this reason the invention is described in this connection at a very rough block diagram level, for reasons of clarity. In terms of the practical implementation of the invention, hardware and software solutions, as well as combinations of them, can be considered. Of course, some of the operations of the modules 16, 18, 23, 24, 25 belonging to the image-processing and/or focussing chain 27, 28 can be implemented even in a single module.

As a surprisingly module, blurring means 17, 22, 26, forming a blurring module 21, are arranged in the image-processing chain 27. Of course, the sub-modules 17, 22, 26 belonging to the module 21 can also provide other tasks in the device 10 than those belonging to blurring, as will be demonstrated later (for example, focussing). The means 17, 22, 26 can be used in a surprising manner to blur at least part of the secondary image objects I2 in the image data ID, which are not the primary object of interest in the imaging target IT, which the sensor 12 detects in its entirety.

In the embodiment of FIG. 1, only the filtering module 17 of the blurring means is shown itself in the actual chain 27. The other modules that implement blurring in the embodiment in question are the filtering-coefficient calculation module 22 and the focussed-area calculation/definition module 26.

In order to blur the image objects I2 that are set to be secondary, the blurring means 17, 22, 26 use the information produced by the focussing-module totality 28. The focussing-area calculation module 26 can use the data obtained from the AF-statistics calculation portion 23 in the definition of the image area I1 and now also the data obtained from the focussing point definition portion 25. Once the portion 26 has been calculated the focussed, i.e. the primary image object in the image data ID, its location in the image information formed by the image data ID, can be determined and also its shape, i.e. the location areas of the one or more primary image objects I1 in the image IT.

The data obtained from the calculation portion 26 of the focussed area can be sent to the filtering coefficient calculation module 22. On the basis of the data of the focussed focus area, i.e. in other words of the portrait area, the final area, which is used in the calculation of the filtering coefficients, can be selected/calculated. This area can even be pixel-accurate, thus delimiting the primary image object I1 very precisely. On the other hand, the portrait area used can be entered, for instance manually, for example, by lassoing from a touch screen, if the device has one. The module 22 can calculate the filtering coefficients, by using which the secondary image objects, i.e. the areas I2 are blurred. The filtering coefficients calculated by the module 22 are provided to the filtering module 17, which performs the blurring of the irrelevant image areas I2. This will be returned to in greater detail in the description of the method given next.

Figure 3:
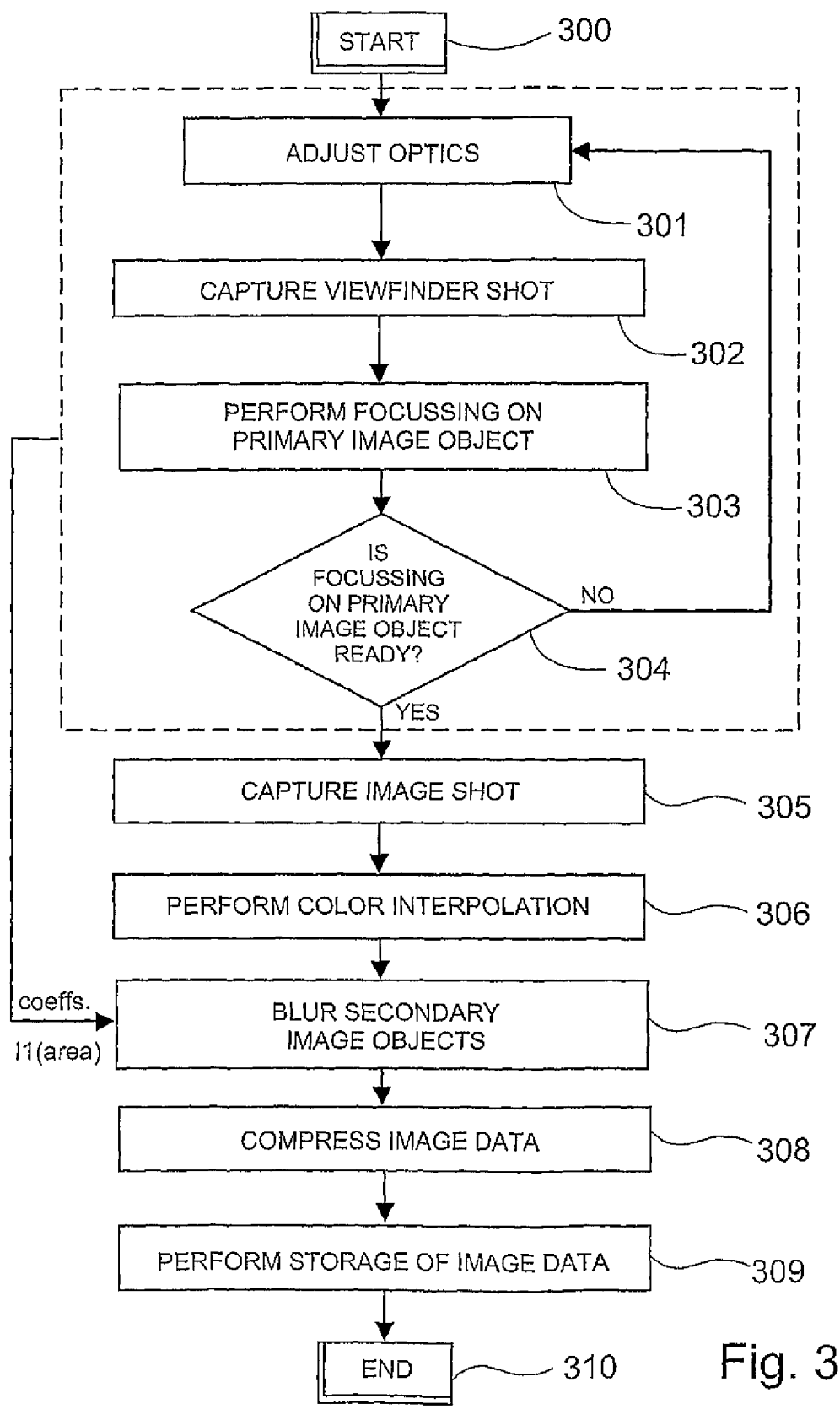
FIG. 3 shows an example in principle of the method according to the invention, as a flow diagram.
Figure 4:
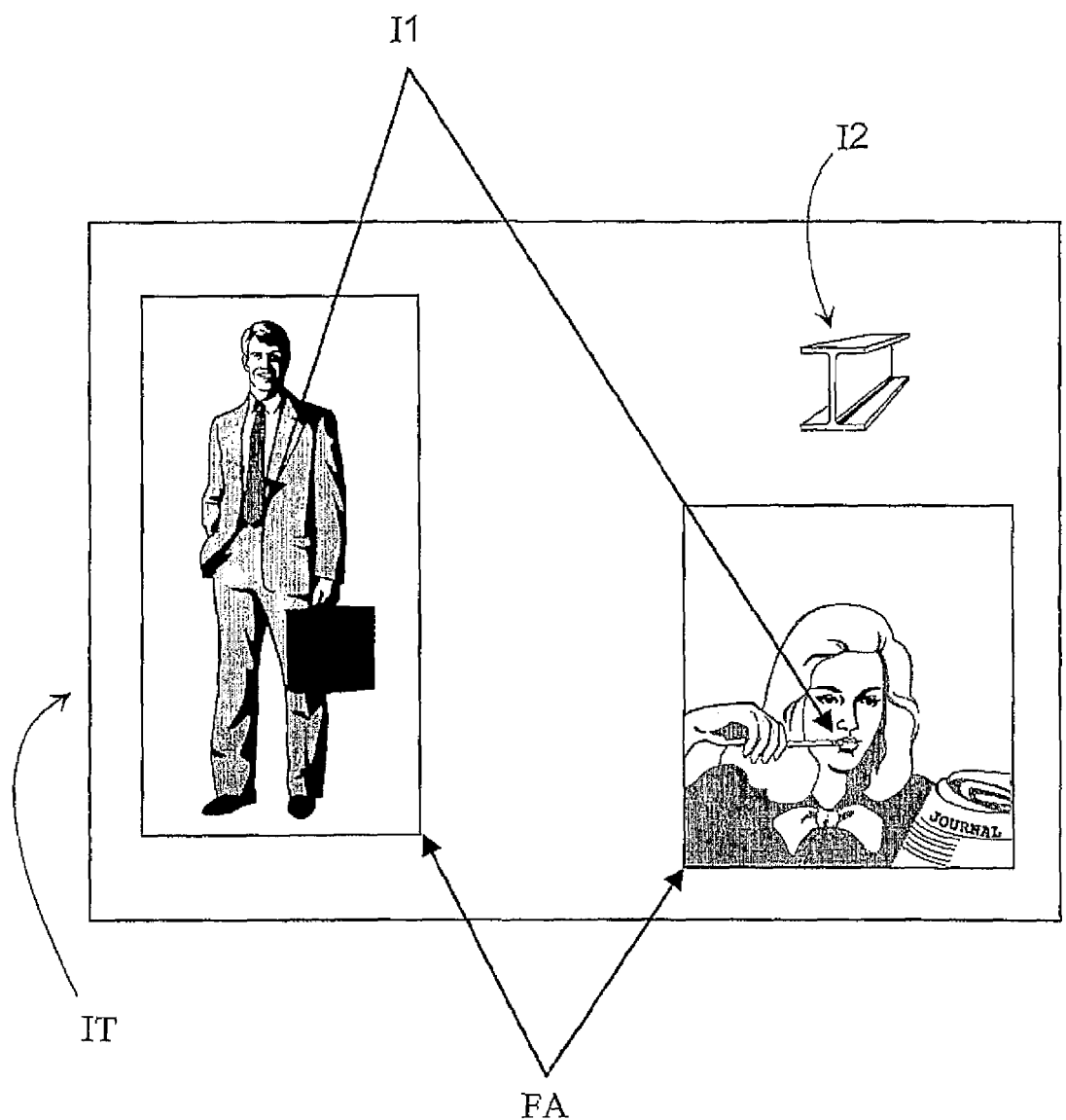
FIG. 4 shows an example of an imaging target, to which the invention is applied.

FIG. 3 shows a flow chart of a schematic example in principle of the method according to the invention in digital imaging for blurring inessential image areas I2. In the method description, reference is made to an example of an imaging situation, which is shown in FIG. 4. In it, the image target IT consists of two people, a man with a briefcase and a woman reading a newspaper, as well as a short length of rolled-steel joist. In this case, the people are the primary image objects I1 while the length of joist is the secondary image object I2, which it is wished to blur. In general, the background area of the entire image area can, in connection with the invention, be understood as being such a secondary image object I2.

When imaging is started with the device 10, the imaging program is activated, as stage 300, which in this case applied automatic focussing. In stage 301, the set of lenses 15 can be adjusted using the mechanism 14 to the initial focussing position.

As stage 302, image data ID is formed using the sensor 12, i.e. viewfinder shots are formed, for example, for the viewfinder VF. In practice, the formation of the image data ID is performed continuously, the frequency being, for example, 15-30 frames per second. In stages 303 and 304, focussing operations that are, as such, known, can be performed. As such, all the blocks 301-304, which are inside the block with a broken line around it, can be understood to be focussing sub-stages.

The actual focussing stages 303 and 304 can be taken care of automatically by the focussing module 28, or allowance can also be made in them for operations made by the user. When focussing is carried out manually by the end user, the user can freely select the primary image objects I1 or image object areas FA, to be focussed, from the viewfinder VF. This automatic or manual selection also affects the objects to be blurred. In stage 303, the user can, for example, from the image data ID formed by the sensor 12 for the viewfinder VF, to define at least one or even more image objects I1, on which it is wished to focus the camera means 11, 14. The selection made by the user can include, for example, the lassoing of an area, in which case even irregular objects can be set as primary image objects I1. On the other hand, the primary image object I1 can also be fitted to a predefined area with a rectangular or other shape. Several different kinds of areas can be predefined in the memory MEM of the device 10.

In the automatic focussing/image-object selection application, focussing can be concentrated on, for example, one or more image areas (for example, on the centre of the imaging object). The focussing points can also be intelligently selected from the entire image area. One example of this is Canon's Ai-AF system (Artificial intelligence AF).

In stage 304, by the module 28, more particularly, for example, its sub-module 24, can be determined whether the image object I1 has been focussed properly.

If it is determined, in stage 304, that the focussing is not correct, the automation 24 calculates new positions for the set of lenses 15. After that, a return is made to stage 301, in which the set of lenses 15 is moved to the new calculated positions. If, however, it is determined in stage 304 that the focussing is correct, the procedure moves to the actual imaging for storing, i.e. to stage 305.

In stage 305, imaging for storing is performed, when the trigger button of the camera 10 can be pressed all the way down. The image data ID captured using the sensor 12 is taken from the module 13, which performs the AD conversion, to the image-processing chain 27. In the image-processing chain 27, colour interpolation, using module 16, for example, can be performed as stage 306. Other stages will also be obvious to one versed in the art and neither they, nor their order of performance are described here in greater detail.

Besides specific one or more image objects I1 being able to be focussed in the previous stages 303 and 304 in a manner that is, as such, known, this focussed image area I1, or more particularly its position, size, and/or shape can also be used to blur the undesired image objects and their areas I2, in stage 307. For this purpose, there are code means 31.1 in the program code 31. In stage 303, the focussing point can be used to indicate one or more objects, i.e. in the context of the invention, a primary image object I1 inside the imaging target IT. Around the selected focussing point, for example, the edges and shapes of the image object I1 can be identified, for example, in order to determine the size of the image object I1 and the position of the focussing point. In other words, this refers to the determining of the size of the primary image object I1. This can be carried out by applying the statistical information from stages 303 and 304, more generally produced by the focussing operation 28 obtained from the focussing stage indicated by the broken line. As a result of the operation, the secondary image objects I2 are, of course, also defined, these being defined by the code means 31.5.

Once the information concerning the position and size of the focussed primary area I1 of the imaging target IT has been obtained, various filtering operations, for example, can be performed on the image, by means of which the background, i.e. the secondary image objects I2 are blurred, or made less sharp, as desired. The code means 31.2 achieves this operation. The filtering can be of, for example, an evening type, such as spatial low-pass filtering. According to one embodiment, in the invention spatial filtering coefficients, for example, can be calculated using the module 22 (code means 31.3). The filtering coefficients can forms, for example, a mask that convolutes the image, which can be used to process the inessential image areas I2.

The convoluting mask, or in general the filtering coefficients can be defined, for example, from the luminance data formed by the focussing portion 28, and even more particularly from the luminance data that refers to the secondary areas I2 that are to be blurred. One criterion for the definition of the coefficients of the mask can then be, for example, that the blurring should be made to create "an even grey", thus avoiding the creation of a background that becomes too dark or too light. As is known, as a result of convolution, the pixel values that are greater or less than the extremes of the luminance scale are generally cut to the extremes of the scale (for example, to zero, or to the value 255, if the depth is 8-bit). In order to avoid this kind of cutting to the extremes, the coefficients of the convoluting mask are attempted to be made to be adapted, using the focussing data, to be such that cutting of this kind does not occur. According to a second embodiment, blurring can also be made in such a way that noise is strongly mixed with the background area, or the secondary areas I2 in general, after which the background (i.e. noise) is low-pass filtered to become even. This too can be handled by the code 31.2. When applying coefficients in the filtering, the focussed area I1 is made to remain untouched, i.e. sharp. In part. this is caused in such a way that the areas of the primary image objects I1 are not processed at all, but only the inessential areas I2 are processed. Correspondingly, as a result of the coefficients, the sharpness of the areas I1 remaining outside of the focussing area, i.e. the secondary areas in the context of the invention, is then reduced.

On the other hand, suitable groups of filtering coefficients groups, i.e. masks, using which filtering is then performed, can also be prearranged in the device 10. Stated in more general terms, the device 10 can provide filtering coefficients, either by calculating them on the fly, or by providing them from a "coefficient bank" prearranged in the memory MEM.

Even more particularly, an area can also be taken into account, for example, in stage 303, in such a way that the edge and/or shape information of the primary image object I1 can be applied to select a non-rectangular shape. In the device 10 there can also be different kinds of precalculated area shapes. An attempt can be made to apply them to the selected primary image object and then select/use the one that fits best. As some examples of these may be mention rectangular, circular, elliptical, and triangular areas FA. Among other things, the use of precalculated areas FA brings an advantage in the use of the processing power of the device 10, because, in the case of area shapes that are frequently repeated, there is no need to perform the calculation again. There are code means 31.4 in the program code 31, for performing this operation.

The result, after the operations according to the invention, is an image, which are limited depth of focus. As final stages 308-310, the image data ID is compressed and stored on the desired medium 19.

FIG. 2 shows a rough schematic diagram of one example of a program product 30 according to the invention. The program product 3C can include a storage medium MEM and program code 31, written on the storage medium MEM, to be executed using the processor means CPU of the device 10, for implementing blurring according to the method of the invention at least partly on a software level. The storage medium MEM of the program code 31 can be, for example, a static or dynamic application memory in the device 10, or a blurring-circuit module totality being in the imaging chain IC, with which it can be directly integrated.

The program code 31 can include several code means 31.1-31.5 to be executed by the processor means, the operation of which can be apply in the method descriptions given immediately above. The code means 31.1-31.5 can consist of a group of processor commands to be performed consecutively, by means of which the functionalities desired, in terms of the invention, are created in the device 10 according to the invention.

Owing to the invention, a background blurring effect can be implemented in small digital cameras too, surprisingly already in the imaging stage, without any need for difficult post-processing. One example of an area of application of the invention can be the blurring of the background in portraits. In portrait applications may be additionally applied face recognition on basis of which the focus area and the background area to be blurred may be calculated. For the recognition may be used the color of the face which can usually be easily recognized by the algorithms known as such. The case-specific calculation of filtering coefficients will achieve the most suitable background/blurring for each imaging target IT.

Though the invention is largely described above as a still-imaging application, it can, of course, also be applied video imaging, as well as to viewfinder imaging performed before the imaging for storing. In video imaging, it should be understood that the flow chart of FIG. 3 will then form a continuous loop, in which imaging, focussing, and blurring can be performed as a continuous process (from block 305 the procedure also moves to block 302). In any event, the imaging for storing is performed whether the focussing is then optimal or not (in stage 304, the procedure moves in the directions of the yes and no arrows). The focussing is iterated automatically to become correct by adjusting the optics 14, without, however, interrupting imaging.

It must be understood that the above description and the related figures are only intended to illustrate the present invention. The invention is thus in no way restricted to only the embodiments disclosed or stated in the Claims, but many different variations and adaptations of the invention, which are possible within the scope on the inventive idea defined in the accompanying Claims, will be obvious to one versed in the art.

The invention claimed is:

1. An apparatus comprising:
   at least one processor; and
   at least one non-transitory memory including computer program code, the at least one memory and the computer program code configured to, with the at least one processor, cause the apparatus at least to perform:
   form image data, with a camera, from an imaging target including at least one primary image object and at least one secondary image object, the camera comprising an image sensor and an analog to digital converter configured to convert the imaging target to image data,
   process, with an image-processing chain arranged in connection with the camera, the image data formed from the imaging target,
   focus, with a focussing circuit, the camera on at least one primary image object,
   define, with the at least one processor, more than one primary image object in the image data and to define the remaining parts of the imaging target as the at least one secondary image object,
   blur, with a blurring filter configured in the image-processing chain, at least the defined at least one secondary image object in the image data, which blurring filter is configured to use the defining of the at least one secondary image object, and
   store, with the at least one non-transitory memory, the blurred image data, wherein the blurred image data being compressed before storing the compressed blurred image data to the at least one non-transitory memory.

2. An apparatus according to claim 1, wherein the focal length equivalency with 35 mm film of the camera is less than or equal to 35 mm.

3. An apparatus according to claim 1, wherein the apparatus comprises a digital camera.

4. An apparatus according to claim 1, wherein the at least one non-transitory memory comprises an application memory.

5. An apparatus according to claim 1, wherein the blurring filter is configured to perform the blurring by filtering the image data.

6. An apparatus according to claim 1, wherein the apparatus is configured to store filtering coefficients, such as, spatial filtering coefficients, and the blurring filter is configured to use the filtering coefficients on performing the blurring.

7. An apparatus according to claim 1, wherein the at least one processor is configured to fit the more than one primary image objects to an area with a set shape, wherein a collection of shape defining coefficients corresponding to these areas is prearranged in the apparatus.

8. An apparatus according to claim 1, wherein the blurring filter is configured to perform the blurring in connection with the formation of the image data.

9. An apparatus according to claim 1, wherein the blurring filter is configured to blur the secondary image objects by applying noise to the areas corresponding to them, which area is then configured to be equalized by low-pass filtering.

10. A method comprising:
    using a camera component of an electronic device to form image data from an imaging target, the imaging target including at least one primary image object and at least one secondary image object, and the camera component comprising an image sensor and an analog to digital converter configured to convert the imaging target to image data,
    focussing the camera component on at least one primary image object,
    using the camera component to form focussed image data, which image data is processed in the electronic device, in order to achieve the desired changes in the image data, the method further comprising:
    defining more than one primary image object in the image data and defining the remaining parts of the imaging target as the at least one secondary image object,
    in the processing, blurring the defined at least one secondary image object in the image data using the defining of the at least one secondary image object, and
    storing the blurred image data to a storage medium of the electronic device, wherein the blurred image data being compressed before storing the compressed blurred image data to the storage medium.

11. A method according to claim 10, wherein the defining of the more than one primary image object is based on information produced in the focussing.

12. A method according to claim 10, wherein the blurring is performed by filtering the image data.

13. A method according to claim 10, wherein filtering coefficients are calculated from the information produced in the focussing, using which the blurring is performed.

14. A method according to claim 10, wherein the more than one primary image objects are fitted to an area with a set shape, the areas outside of which area are blurred.

15. A method according to claim 10, wherein the blurring is performed in connection with the formation of the image data.

16. A method according to claim 10, wherein the secondary image objects are blurred by configuring noise in the areas corresponding to them, which area is then low-pass filtered to equalize it.

17. A computer program stored in a non-transitory computer readable storage medium to be executed by an electronic device, the electronic device including:
    a camera component configured to form image data from an imaging target, the imaging target including at least one primary image object and at least one secondary image object, and the camera component comprising an image sensor and an analog to digital converter configured to convert the imaging target to image data, an image-processing chain arranged in connection with the camera component, configured to process the image data formed from the imaging target, and a focussing circuit configured to focus the camera component on at least one primary image object, wherein the computer program comprises a computer executable program code configured to cause the electronic device to when executed by the electronic device to;

define more than one primary image object in the image data and define the remaining parts of the imaging target as the at least one secondary image object, blur the more than one secondary image object in the image data, using the defining of the at least one secondary image object, and store, in the image-processing chain, the blurred image data to a storage medium, wherein the blurred image data being compressed before storing the compressed blurred image data to the storage medium.

18. A computer program according to claim 17 wherein the computer code is further configured to cause the blurring by filtering.

19. A computer program according to claim 17, wherein the program code is configured to be executed in connection with the formation of the image data.

* * * * *